United States Patent
Petrick et al.

(10) Patent No.: US 7,488,947 B1
(45) Date of Patent: Feb. 10, 2009

(54) SYSTEMS, METHODS AND APPARATUS FOR CORRECTION OF FIELD-EFFECT TRANSISTOR LEAKAGE IN A DIGITAL X-RAY DETECTOR

(75) Inventors: Scott William Petrick, Sussex, WI (US); James Zhengshe Liu, Glenview, IL (US); Frank Gao, Naperville, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/835,534

(22) Filed: Aug. 8, 2007

(51) Int. Cl.
*G01T 1/24* (2006.01)
(52) U.S. Cl. .................................... 250/370.09
(58) Field of Classification Search ................ 250/370.01–370.15
See application file for complete search history.

(56) References Cited

U.S. PATENT DOCUMENTS 6,400,798 B1   6/2002   Leparmentier et al.

*Primary Examiner*—David P Porta
*Assistant Examiner*—Kiho Kim
(74) *Attorney, Agent, or Firm*—Peter Vogel, Esq.; Bill Baxter, Esq.; Michael G. Smith, Esq.

(57) ABSTRACT

Systems, methods and apparatus are provided through which in some embodiments field-effect-transistor (FET) leakage is estimated recursively from a pixel value obtained when the FET is off. The corrected pixel value is then obtained by subtracting the FET leakage estimate from the pixel value read when the FET is on. A weighing factor is introduced for the FET leakage estimation to achieve the balance between image noise and correction resolution.

23 Claims, 2 Drawing Sheets

US 7,488,947 B1

SYSTEMS, METHODS AND APPARATUS FOR CORRECTION OF FIELD-EFFECT TRANSISTOR LEAKAGE IN A DIGITAL X-RAY DETECTOR

FIELD OF THE INVENTION

This invention relates generally to medical diagnostic imaging systems, and more particularly to correcting image artifacts due to leakage of field-effect transistors (FET) in medical imaging systems employing solid state detectors.

BACKGROUND OF THE INVENTION

X-ray imaging has long been an accepted medical diagnostic tool. X-ray imaging systems are commonly used to capture, as examples, thoracic, cervical, spinal, cranial, and abdominal images that often include information necessary for a doctor to make an accurate diagnosis. X-ray imaging systems typically include an X-ray source and an X-ray sensor. When having a thoracic X-ray image taken, for example, a patient stands with his or her chest against the X-ray sensor as an X-ray technologist positions the X-ray sensor and the X-ray source at an appropriate height. X-rays produced by the source travel through the patient's chest, and the X-ray sensor then detects the X-ray energy generated by the source and attenuated to various degrees by different parts of the body. An associated control system obtains the detected X-ray energy from the X-ray sensor and prepares a corresponding diagnostic image on a display.

The X-ray sensor may be a conventional screen/film configuration, in which the screen converts the X-rays to light that exposes the film. The X-ray sensor may also be a solid state digital image detector. Digital detectors afford a significantly greater dynamic range than conventional screen/film configurations, typically as much as two to three times greater.

One embodiment of a solid state digital X-ray detector may be comprised of an array of semiconductor field-effect transistors (FETs) and photodiodes. All photodiodes on a column are connected to readout electronics with data lines through the FETs. A FET controller controls the order in which the FETs are turned on and off so that the photodiodes on a row are selected. When the FETs are turned on, a charge to establish the FET channel is drawn into the photodiodes from the readout electronics. On top of the photodiodes, there is a layer of scintillation material (scintillator), such as cesium iodide (CsI) that is used to convert X-rays into visible light. The photodiodes are fully charged before an X-ray exposure and under ideal conditions, the parasitic capacitance of the photodiode retains the charge in the absence of light and X-ray exposure. During exposure, the photodiodes discharge. The amount of discharge is proportional to the X-ray dose received. After the X-ray exposure is complete, the diodes are charged again. The amount of charge restored to a diode is equal to that which was discharged by the exposure and is used by an acquisition system to modulate the intensity of the respective pixels in the displayed digital diagnostic image.

The FETs in the X-ray detector act as switches to control the charging of the photodiodes. When a FET is open (off), an associated photodiode is isolated from the readout electronics. When the FET is closed (on), the photodiode is recharged to an initial charge by the readout electronics. Light is emitted by the scintillator in response to received X-rays. The photodiodes sense the emitted light and are partially discharged. Thus, while the FETs are open (off), the photodiodes retain a charge which may be the initial charge, prior to the X-ray exposure, or less charge because the initial charge has been diminished by the light detected by the photodiode during exposure. When a FET is closed (on), a desired voltage across the photodiode is restored. The measured charge amount to re-establish the desired voltage becomes a measure of the X-ray dose integrated by the photodiode during the length of the X-ray exposure.

X-ray images may be used for many purposes. For instance, internal defects in a target object may be detected. Additionally, changes in internal structure or alignment may be determined. Furthermore, the image may show the presence or absence of objects in the target. The information gained from X-ray imaging has applications in many fields, including medicine and manufacturing.

A FET that operates with ideal results operates as a switch with the state of "open/off" and "closed/on." In practicality, however, the perfect FET does not exist. There will be always some amount of leakage when a FET is in the state of "open/off", which is called FET leakage. FET leakage generates a variety of image artifacts.

BRIEF DESCRIPTION OF THE INVENTION

The above-mentioned shortcomings, disadvantages and problems are addressed herein, which will be understood by reading and studying the following specification.

In one aspect, a method to correct image artifacts in digital X-ray data due to field-effect-transistor (FET) leakage without introducing excessive amounts of image noise includes determining a coefficient of correction of FET leakage based upon a threshold of electronic noise, updating FET leakage estimates using the coefficient of correction, reading FET on pixel data from the panel of the digital X-ray detector and calculating the corrected pixel data by subtracting the FET leakage estimate obtained from the FET off reading from the pixel data of the FET on reading.

In another aspect, a computer-accessible medium having executable instructions to acquire digital X-ray image data, the executable instructions capable of directing a processor to determine a weighting factor of FET leakage based upon a threshold of electronic noise. The executable instructions are also capable of directing a processor to recursively perform, for each of a plurality of rows of a digital X-ray detector, determining the pixel data of the FET off reading from the coefficient of correction, updating FET leakage estimates using the coefficient of correction, reading FET on pixel data from the panel of the digital X-ray detector and calculating the corrected pixel data by subtracting FET leakage estimate from the pixel data of the FET on reading.

In yet another aspect, a system to correct image artifacts due to FET leakage in a digital X-ray detector includes a processor, a storage device coupled to the processor and software apparatus. The software apparatus is operable to determine a coefficient of correction of FET leakage based upon a threshold of electronic noise, determine the FET leakage estimate from the coefficient of correction, update FET leakage estimates using the coefficient of correction, reading FET on pixel data from the panel of the digital X-ray detector and calculate the corrected pixel data by subtracting the FET leakage estimate from the pixel data of the FET on reading.

In still another embodiment, a solid state detector for use in detecting electromagnetic energy that includes a substrate and a panel array of field-effect transistors and photodiodes arranged in a plurality of rows positioned above the substrate. The solid state detector also includes a scintillator positioned above the panel array of field-effect transistors and photodiodes and readout electronics coupled to each of the field effect transistors in the panel array. The solid state detector also includes one or more digital output coupled to the read-out electronics and means for correcting the at least one digital output due to field-effect transistor leakage from the panel array of field-effect transistors in real-time.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into four sections. In the first section, a system level overview is described. In the second section, embodiments of methods are described. In the third section, particular implementations are described. Finally, in the fourth section, a conclusion of the detailed description is provided.

System Level Overview

Figure 1:
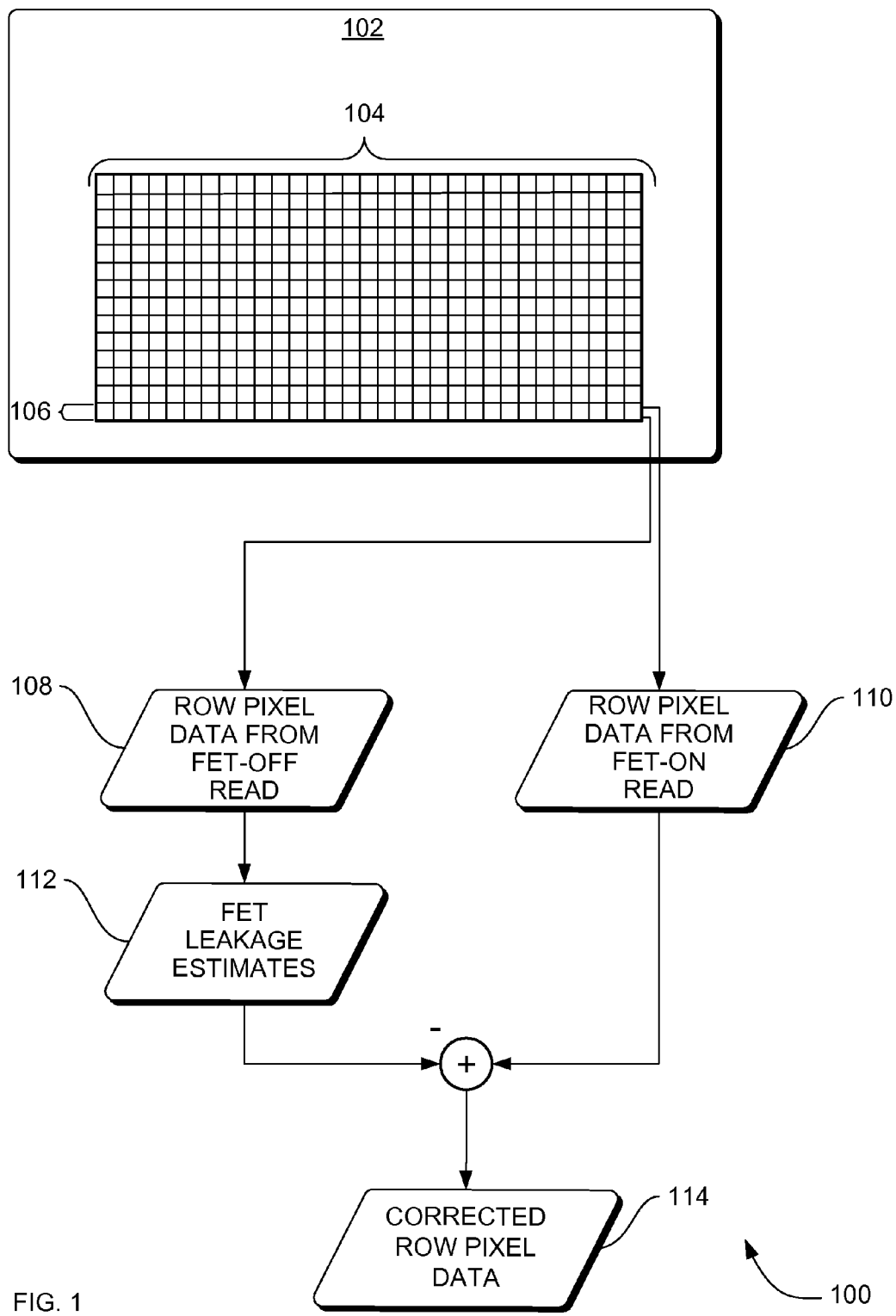
FIG. 1 is a diagram illustrating a system-level overview of an embodiment of a solid state detector that self-corrects output with imperceptible latency to compensate for deficiencies of detection means.

FIG. 1 is a block diagram of an overview of a system 100 that self-corrects output with imperceptible latency to compensate for deficiencies in detection means. System 100 includes a solid state detector 102 that includes a panel 104 or array of semiconductor FETs and photodiodes. The panel 104 includes a plurality of rows 106 of semiconductor FETs and photodiodes. In some examples, the solid state detector 102 is a high-sensitivity detection (HSD) digital X-ray detector.

The charge signal emanating from each of a plurality of column-wise data lines is read twice for each one of the rows 106. One of the two reads for each row is performed while the FETs of the row are turned off, which generates row pixel data 108. The other of the two reads for each row is performed while the FETs of the row are turned on, which generates row pixel data 110. The FET off reading is alternated with the FET on reading.

The pixel data 108 of the FET off reading, FET leakage estimates 112 and the pixel data 110 of the FET on reading is used to determine 114. The corrected pixel data 114 is generated in real-time with an imperceptible latency to compensate for FET leakage.

While the system 100 is not limited to any particular solid state detector 102, panel 104, rows 106, row pixel data 108 from FET off reading, row pixel data 110 from FET on reading, FET leakage estimates 112 and corrected row pixel data 114, for sake of clarity a simplified solid state detector 102, panel 104, rows 106, row pixel data 108 from FET off reading, row pixel data 110 from FET on reading, FET leakage estimates 112 and corrected row pixel data 114 are described. In another embodiment, the solid state detector 102 may be a light detector.

The system level overview of the operation of an embodiment is described above in this section of the detailed description. Some embodiments operate in a multi-processing, multi-threaded operating environment on a computer.

METHOD EMBODIMENTS

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. In some embodiments, method 200 is performed by a program executing on, or performed by firmware or hardware that is a part of, a solid state detector, such as a digital X-ray detector. In some embodiments, method 200 is performed by a program executing on, or performed by firmware or hardware that is a part of, a computer. In other embodiments, method 200 is performed by hardware that is separate from a computer.

Figure 2:
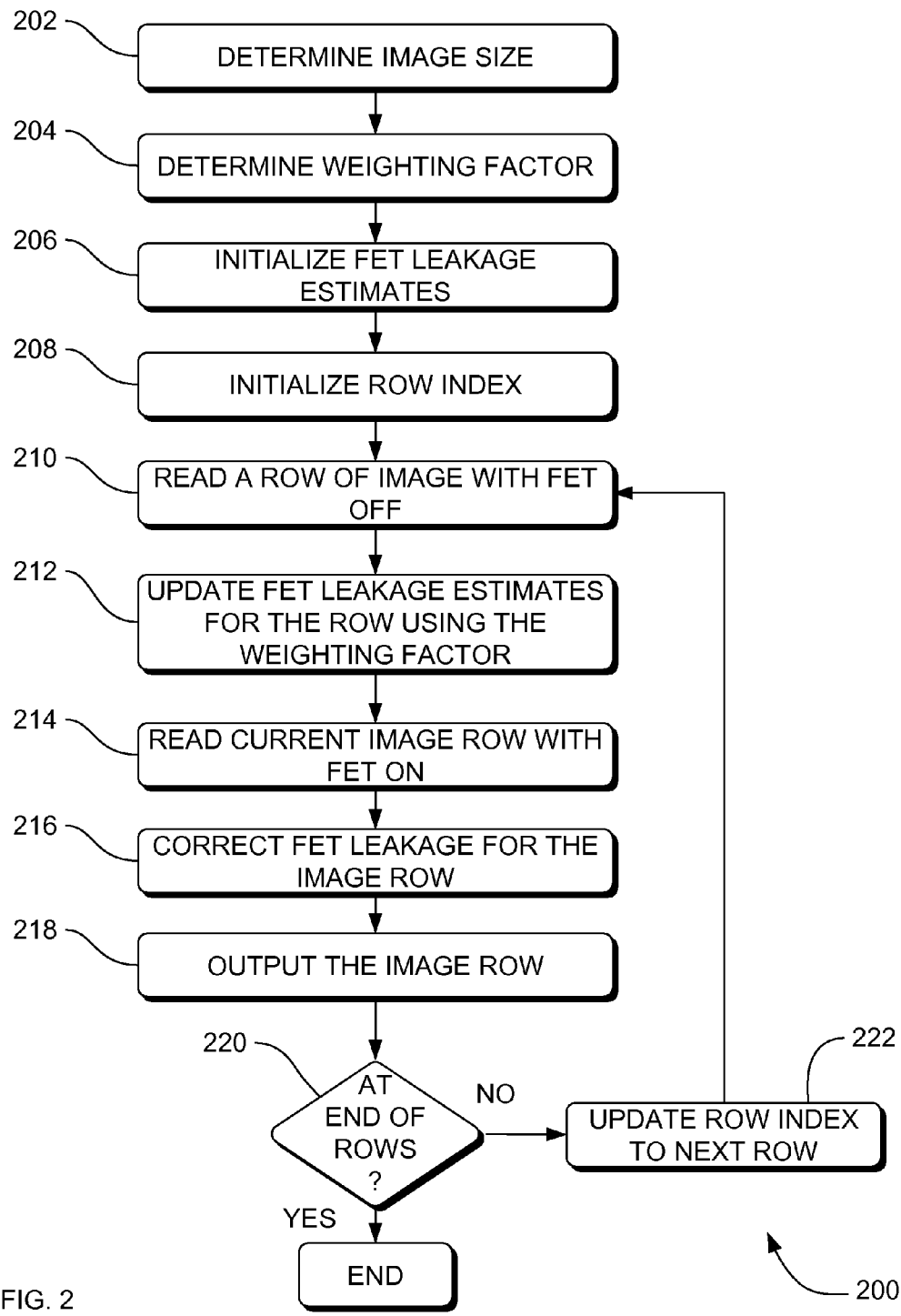
FIG. 2 is a flowchart of a method to correct field-effect-transistor (FET) leakage in a solid state detector, according to an embodiment.

FIG. 2 is a flowchart of a method 200 to correct (FET) leakage in a solid state detector, according to an embodiment. Method 200 can be performed by a digital X-ray detector, in which case, the digital X-ray detector self-corrects in real-time for FET leakage. Method 200 can be implemented by an electromagnetic energy detector other than an X-ray detector, such as a light detector.

Some embodiments of method 200 also perform blocks 202, 204, 206 and 208 one time in order to prepare for repetition of blocks 210, 212, 214, 216 and 218 for each row of pixel data in the digital X-ray detector. The method is performed for each row of pixels in real-time with an imperceptible processing time, so that when the corrected pixels are transmitted to another device, such as an imaging workstation, the correction has been performed without any practical delay in the image scanning process by the detector.

Thus, some embodiments of method 200 include determining a size of an image of the pixel data, at block 202. Method 200 includes determining a coefficient of correction of FET leakage based upon a threshold of electronic noise, at block 204.

Some embodiments of method 200 also include estimating at least one estimate of the FET leakage, at block 206, which generates the FET leakage estimates 112 in FIG. 1. Some embodiments of method 200 also include initializing a row index, at block 208, such as initializing the row index to zero. The maximum row value represents the number of rows in the detector.

For each of a plurality of rows of the detector, some embodiments of method 200 also include determining the pixel data of the FET off reading at block 210.

Method 200 also includes updating FET leakage estimates recursively using the coefficient of correction, at block 212. In some embodiments, recursively updating the estimates of the FET leakage at block 212 is represented by the following equation:

$$\hat{d}_{i,j}^{\{off\}} = \alpha \cdot \hat{d}_{i-1,j}^{\{off\}} + (1-\alpha) \cdot d_{i,j}^{\{off\}}$$

Where $\hat{d}_{i,j}^{\{off\}}$ represents an estimate of the FET leakage for pixel at row i and column j in the panel, where α represents a coefficient of correction such as a weighting factor that is used to balance current FET off data and historical FET off data on a column (e.g. column "j") in FET leakage estimation and where 0<α<1, where $\hat{d}_{i-1,j}^{\{off\}}$ represents an estimate of the FET leakage for the pixel at column j and the previous row i−1 and where $d_{i,j}^{\{off\}}$ represents the data of the pixel at column j and row i that was read while the FET was off.

Method 200 also includes updating FET leakage estimates using the coefficient of correction, at block 212. Some embodiments of method 200 also include reading FET on pixel data from the panel of the detector, at block 214.

In some embodiments, calculating the pixel data by subtracting the FET leakage estimate from the pixel data of the FET on reading at block 216 is represented by the following equation:

$$p_{i,j} = d_{i,j}^{\{on\}} - \hat{d}_{i,j}^{\{off\}}$$

Where $p_{i,j}$ represents FET leakage corrected pixel value at row i and column j, $d_{i,j}^{\{on\}}$ represents the data of the pixel at column j and row i that was read while the FET was on and $\hat{d}_{i,j}^{\{off\}}$ represents FET leakage estimate for the pixel at column j and row i that was obtained from the pixel value read while the FET was off.

Thereafter, method 200 includes outputting or transmitting the image row of pixel data that is corrected for FET leakage, at block 218. In some embodiments, the outputting at block 218 includes storing the corrected pixel data to a memory device.

Recursive processing of the row data implementation in some embodiments of method 200 also include determining whether or not the row index is not equal to or greater than a maximum row value, at block 220 and if so, then incrementing the row index at block 222. The maximum row value represents the number of rows in the detector. If the row index is equal or greater to a maximum row value, then performance of the method 200 ends.

The readout data is represented by:

$$d_{i,j}^{\{off\}} = p_{i,j}^{\{off\}} + n_{i,j}^{\{off\}}$$

and $$d_{i,j}^{\{on\}} = p_{i,j}^{\{on\}} + n_{i,j}^{\{on\}}$$

Where $n_{i,j}^{\{off\}}$ and $n_{i,j}^{\{on\}}$ represent the electronic white noise with zero-mean and standard deviation τ and where $p_{i,j}^{\{off\}}$ represents pixel data 108 at row i and column j from FET-off read in block 210 and $p_{i,j}^{\{on\}}$ represents pixel data 110 at row i and column j from FET-on read in block 214.

In accordance with probability principle, the standard deviation of the image after FET leakage correction is described by:

$$\sqrt{E\{[\hat{p}_{i,j} - E(\hat{p}_{i,j})]^2\}} = \sqrt{1 + \frac{1-\alpha}{1+\alpha}}\, \sigma$$

Where E represents the operator of mathematical expectation, $\hat{p}_{i,j}$ represents FET leakage corrected pixel value at row i and column j. The ratio of the standard deviation of the image after correction to that before correction is:

$$\frac{\sqrt{1 + \frac{1-\alpha}{1+\alpha}}\, \sigma}{\sigma} = \sqrt{1 + \frac{1-\alpha}{1+\alpha}}$$

In one example, by selecting the threshold of electronic noise increment of 10%, the coefficient α=0.65 is determined by the following equations:

$$\sqrt{1 + \frac{1-\alpha}{1+\alpha}} = 1.1$$

Or:

$$1 + \frac{1-\alpha}{1+\alpha} = 1.1^2 = 1.21.$$

Which is:

$$\frac{1-\alpha}{1+\alpha} = 0.21.$$

Multiplying (1+α) on both ends of the equation yields,

1−α=0.21+0.21α which is equivalent to 1.21α=0.79.

In which case:

$$\alpha = \frac{0.79}{1.21} = 0.65$$

Note that the larger the α, the less electronic noise will be introduced due to FET leakage correction. On the other hand, a larger α will result in less FET leakage correction performance. The electronic noise and correction performance can be balanced according to the system requirements. For instance, to control the electronic noise increment within 10%, α=0.65 can be selected. In another implementation, to control the electronic noise increment within 15%, α=0.5 could be selected.

In some embodiments, method 200 is implemented in programmable devices as a collection of cooperating finite state machines. In other embodiments, method 200 is implemented as a computer data signal embodied in a carrier wave, that represents a sequence of instructions which, when executed by a processor (in the broadest sense of the word, and not limited to, for example, a commercially available computer or microprocessor), cause the processor to perform the respective method. In other embodiments, method 200 is implemented as a computer-accessible medium having executable instructions capable of directing a processor to perform the respective method. In varying embodiments, the medium is a magnetic medium, an electronic medium, or an optical medium.

The following description provides an overview of computer hardware and a suitable computing environment in conjunction with which some embodiments can be implemented. Embodiments are described in terms of a computer executing computer-executable instructions. However, some embodiments can be implemented entirely in computer hardware in which computer-executable instructions are implemented in read-only memory. Some embodiments can also be implemented in client/server computing environments where remote devices that perform tasks are linked through a communications network. Program modules can be located in both local and remote memory storage devices in a distributed computing environment.

A computer includes a processor, commercially available from Intel, Motorola, Cyrix and others. A computer also includes random-access memory (RAM), read-only memory (ROM), one or more mass storage devices, and a system bus, that operatively couples various system components to the processing unit. The memory and mass storage devices are types of computer-accessible media. Mass storage devices are more specifically types of nonvolatile computer-accessible media and can include one or more hard disk drives, floppy disk drives, optical disk drives, and tape cartridge drives. The processor executes computer programs stored on a computer-accessible media.

A computer can be communicatively connected to the Internet via a communication device. Internet connectivity is well known within the art. In one embodiment, a communication device is a modem that responds to communication drivers to connect to the Internet via what is known in the art as a "dial-up connection." In another embodiment, a communication device is an Ethernet® or similar hardware network card connected to a local-area network (LAN) that itself is connected to the Internet via what is known in the art as a "direct connection" (e.g., T1 line, etc.).

A user enters commands and information into a computer through input devices such as a keyboard or a pointing device. The keyboard permits entry of textual information into computer, as known within the art, and embodiments are not limited to any particular type of keyboard. A pointing device permits the control of the screen pointer provided by a graphical user interface (GUI) of operating systems such as versions of Microsoft Windows®. Embodiments are not limited to any particular pointing device. Such pointing devices include mice, touch pads, trackballs, remote controls and point sticks. Other input devices (not shown) can include a microphone, joystick, game pad, satellite dish, scanner, or the like.

In some embodiments, a computer is operatively coupled to a display device. The display device is connected to the system bus. A display device permits the display of information, including computer, video and other information, for viewing by a user of a computer. Embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). Speakers provide audio output of signals. The speakers are also connected to the system bus.

A computer also includes an operating system that is stored on a computer-accessible media, the RAM, the ROM, and/or the mass storage device, and is executed by the processor. Examples of operating systems include Microsoft Windows®, Apple MacOS®, Linux®, UNIX®. Examples are not limited to any particular operating system, however, and the construction and use of such operating systems are well known within the art.

Embodiments of a computer are not limited to any type of computer. In varying embodiments, a computer comprises a PC-compatible computer, a MacOS®-compatible computer, a Linux®-compatible computer, or a UNIX®-compatible computer. The construction and operation of such computers are well known within the art.

A computer can be operated using at least one operating system to provide a graphical user interface (GUI) including a user-controllable pointer. A computer can have at least one web browser application program executing within at least one operating system, to permit users of a computer to access an intranet, extranet or Internet world-wide-web pages as addressed by Universal Resource Locator (URL) addresses. Examples of browser application programs include Netscape Navigator® and Microsoft Internet Explorer®.

A computer can operate in a networked environment using logical connections to one or more remote computers. These logical connections are achieved by a communication device coupled to, or a part of, a computer. Embodiments are not limited to a particular type of communications device. The remote computer can be another computer, a server, a router, a network PC, a client, a peer device or other common network node. The logical connections include a local-area network (LAN) and a wide-area network (WAN). Such networking environments are commonplace in offices, enterprise-wide computer networks, intranets, extranets and the Internet.

When used in a LAN-networking environment, a computer and remote computer are connected to the local network through network interfaces or adapters, which is one type of communications device. Remote computer also includes a network device. When used in a conventional WAN networking environment, a computer and remote computer communicate with a WAN through modems (not shown). The modem, which can be internal or external, is connected to the system bus. In a networked environment, program modules depicted relative to a computer, or portions thereof, can be stored in the remote computer.

A computer also includes at least one power supply. Each power supply can be a battery.

Apparatus components of FIG. 1 and the method in FIG. 2 can be embodied as computer hardware circuitry, as a computer-readable program, as programmable hardware (such as a field programmable gate array (FPGA)), as dedicated, inflexible hardware, or any combination thereof. In another embodiment, the apparatus and methods are implemented in an application service provider (ASP) system.

More specifically, in a computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer, or on at least as many computers as there are components.

CONCLUSION

Systems, methods and apparatus of correcting the FET leakage in a solid state detector, such as a digital X-ray detector or a light detector are described. A technical effect of the systems, method and apparatus is the correction of image data from the solid state detector. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all solid state detector and FET environments and alternate technologies which provide the same functionality as described herein.

We claim:

1. A method comprising:
   determining a coefficient of correction of field-effect-transistor leakage based upon a threshold of electronic noise;
   initializing field-effect-transistor leakage estimates of a panel of a digital X-ray detector;
   reading field-effect-transistor off pixel data from the panel of the digital X-ray detector;
   updating the field-effect-transistor leakage estimates using the coefficient of correction;
   reading field-effect-transistor on pixel data from the panel of the digital X-ray detector;
   correcting the pixel data by subtracting the field-effect-transistor leakage estimate from the field-effect transistor on pixel data.

2. The method of claim 1, wherein the coefficient of correction further comprises:
   a weighting factor.

3. The method of claim 1, the method further comprising:
   determining a size of an image of the pixel data.

4. The method of claim 1, the method further comprising:
   estimating at least one estimate of the field-effect-transistor leakage.

5. The method of claim 1, the recursive performance further comprises:
   performing for each of a plurality of rows of the digital X-ray detector, the reading field-effect transistor off pixel data, the reading field-effect transistor on pixel data, the updating field-effect-transistor leakage estimates and the correcting the pixel data.

6. The method of claim 5, the method further comprising:
   initializing a row index.

7. The method of claim 6, the method further comprising:
   determining that the row index is not equal to or greater than a maximum row value; and
   incrementing the row index.

8. A computer-accessible medium having executable instructions capable of directing a processor to perform:
   determining a weighting factor of field-effect-transistor leakage based upon a threshold of electronic noise, and
   directing a processor to perform for each of a plurality of rows of a panel of a digital X-ray detector:
   reading field-effect transistor off pixel data from the panel of the digital X-ray detector;
   updating an initialized field-effect-transistor leakage estimate using the coefficient of correction;
   reading field-effect transistor on pixel data from the panel of the digital X-ray detector;
   correct the pixel data by subtracting the field-effect transistor leakage estimate from the field-effect transistor on pixel data; and
   storing the corrected pixel data in a memory device.

9. The computer-accessible medium of claim 8, the medium further comprising executable instructions capable of directing the processor to perform:
   determine a size of an image of the pixel data.

10. The computer-accessible medium of claim 8, the medium further comprising executable instructions capable of directing the processor to perform:
    estimate at least one estimate of the field-effect-transistor leakage.

11. The computer-accessible medium of claim 8, the medium further comprising executable instructions capable of directing the processor to perform:
    initialize a row index.

12. The computer-accessible medium of claim 11, the medium further comprising executable instructions capable of directing the processor to perform for each row:
    determine that the row index is not equal to or greater than a maximum row value; and
    increment the row index.

13. A system to correct field-effect-transistor leakage in a digital X-ray detector comprising:
    a processor;
    a digital X-ray detector coupled to the processor;
    a storage device coupled to the processor; and
    a software component operable on the processor to:
       determine a coefficient of correction of field-effect-transistor leakage from a threshold of electronic noise;
       read field-effect transistor off pixel data from a panel of the digital X-ray detector;
       update an initialized field-effect-transistor leakage estimate using the coefficient of correction;
       read field-effect transistor on pixel data from the panel of the digital X-ray detector;
       correct the pixel data by subtracting the field-effect transistor leakage estimate from the field-effect transistor on pixel data; and
       store the corrected pixel data in the storage device.

14. The system of claim 13, wherein the coefficient of correction further comprises:
    a weighting factor.

15. The system of claim 13, wherein the software component is further operable to:
    determine a size of an image of the pixel data.

16. The system of claim 13, wherein the software component is further operable to:
    estimate at least one estimate of the field-effect-transistor leakage.

17. The system of claim 13, wherein the software component is further operable to:
    for each of a plurality of rows of the digital X-ray detector, read field-effect transistor off pixel data, read field-effect transistor on pixel data, determine the field-effect transistor leakage estimate and calculate the corrected pixel data.

18. The system of claim 17, wherein the software component is further operable to:
    initialize a row index.

19. The system of claim 18, wherein the software component is further operable to:
    determine that the row index is not equal to or greater than a maximum row value; and
    increment the row index.

20. The system of claim 13, wherein the digital X-ray detector further comprises:
    a high-sensitivity detection digital X-ray detector.

21. A solid state detector for use in detecting electromagnetic energy comprising:
    a substrate;
    a panel array of field-effect transistors and photodiodes arranged in a plurality of rows positioned above the substrate;
    a scintillator positioned above the panel array of field-effect transistors and photodiodes;
    readout electronics coupled to each of the field effect transistors in the panel array;
    at least one digital output coupled to the readout electronics; and
    apparatus operable to determine a coefficient of correction of the field-effect-transistor leakage based upon a threshold of electronic noise and operable to correct the at least one digital output due to field-effect transistor leakage from the panel array of field-effect transistors in real-time using the coefficient of correction.

22. The solid state detector of claim 21, wherein the readout electronics further comprises:
    apparatus operable to read field-effect-transistor off pixel data
    from a panel of the digital X-ray detector; and apparatus operable to read field-effect-transistor on pixel data
    from the panel of the digital X-ray detector.

23. The solid state detector of claim 21, wherein the apparatus operable to correct the at least one digital output due to field-effect transistor leakage further comprises:
    apparatus operable to initialize field-effect-transistor leakage estimates;
    apparatus operable to update field-effect-transistor leakage estimates using the coefficient of correction;
    apparatus operable to correct the pixel data by subtracting the field-effect-transistor leakage estimate from the field-effect transistor on pixel data; and
    apparatus operable to store the corrected pixel data in a memory device.

* * * * *